(12) United States Patent
Lucas et al.

(10) Patent No.: US 8,105,512 B1
(45) Date of Patent: Jan. 31, 2012

(54) INFILTRATED CARBON FOAM COMPOSITES

(75) Inventors: Rick D. Lucas, St. Clairsville, OH (US);
Harry E. Danford, Bethesda, OH (US);
Janusz W. Plucinski, Glen Dale, WV (US); Douglas J. Merriman, Wheeling, WV (US); Jesse M. Blacker, Bridgeport, OH (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 369 days.

(21) Appl. No.: 12/506,976

(22) Filed: Jul. 21, 2009

Related U.S. Application Data

(60) Provisional application No. 61/082,360, filed on Jul. 21, 2008.

(51) Int. Cl.
*C01B 31/00* (2006.01)
*C08J 7/00* (2006.01)

(52) U.S. Cl. .......... 264/29.5; 264/43; 264/44; 264/45.1; 423/445 R; 423/460; 428/306.6; 428/304.4; 428/305.5; 428/307.3; 428/307.7; 428/408

(58) Field of Classification Search ............... 264/29.5, 264/43, 44, 45.1; 423/445 R, 460; 428/304.4, 428/305.5, 306.6, 307.3, 307.7, 408; 521/62, 521/63, 180, 181
See application file for complete search history.

(56) References Cited

U.S. PATENT DOCUMENTS

| | | | | |
|---|---|---|---|---|
| 3,632,385 A | * | 1/1972 | Schmitt et al. | 427/228 |
| 5,770,127 A | * | 6/1998 | Abrams et al. | 264/29.1 |
| 6,245,313 B1 | * | 6/2001 | Suzuki et al. | 423/445 R |
| 7,892,636 B2 | * | 2/2011 | Miller et al. | 428/306.6 |
| 2009/0098383 A1 | * | 4/2009 | Brown et al. | 428/408 |
| 2011/0180032 A1 | * | 7/2011 | Mungas et al. | 123/193.5 |

* cited by examiner

*Primary Examiner* — Irina S Zemel
(74) *Attorney, Agent, or Firm* — Philip D. Lane

(57) ABSTRACT

An infiltrated carbon foam composite and method for making the composite is described. The infiltrated carbon foam composite may include a carbonized carbon aerogel in cells of a carbon foam body and a resin is infiltrated into the carbon foam body filling the cells of the carbon foam body and spaces around the carbonized carbon aerogel. The infiltrated carbon foam composites may be useful for mid-density ablative thermal protection systems.

11 Claims, No Drawings

INFILTRATED CARBON FOAM COMPOSITES

CROSS-REFERENCE TO RELATED APPLICATIONS

This application claims priority to U.S. Provisional Patent Application No. 61/082,360, filed Jul. 21, 2008, herein specifically incorporated by reference in its entirety.

STATEMENT REGARDING FEDERALLY SPONSORED RESEARCH OR DEVELOPMENT

This invention was made with Government support under contract number NNX08CB08P awarded by NASA Ames Research Center. The Government has certain rights in the invention.

FIELD OF THE INVENTION

The present invention relates to infiltrated carbon foam composites and methods for making the same. The carbon foam composites may have utility in medium density ablative thermal protection systems.

SUMMARY OF THE INVENTION

An embodiment of the invention may include an infiltrated carbon foam composite comprising a carbon foam body having a plurality of open cells distributed throughout the carbon foam body, carbonized carbon aerogel located within at least a portion of the cells of the carbon foam body, and a resin filling at least a portion of the carbon foam cells containing carbonized carbon aerogel.

The invention may also include a method for making an infiltrated carbon foam composite comprising the steps of forming a carbon aerogel in the cells of a carbon foam body, carbonizing the carbon aerogel within the cells of the carbon foam body, and infiltrating the carbon foam body having carbonized carbon aerogel within cell of the carbon foam body with a resin.

DETAILED DESCRIPTION OF EMBODIMENTS OF THE INVENTION

The present invention is directed to infiltrated carbon foam composite materials. Some embodiments are directed to infiltrated carbon foam composites in which carbonized carbon aerogel is located within cells of a carbon foam body and a polymer matrix is infiltrated into the cells of the carbon foam body thus infiltrating the carbon foam body and carbonized carbon aerogel that is positioned in the cells of the carbon foam body.

In some embodiments, the infiltrated carbon foam composite may comprise a carbon foam body having a plurality of open cells distributed throughout the carbon foam body. As used herein "carbon foam" is a porous carbon product containing regularly shaped, predominately concave, homogeneously dispersed, cells which interact to form a three-dimensional array throughout a continuum of material of carbon, predominately in the non-graphitic state. Embodiments of the invention utilize and open celled carbon foam. An open celled carbon foam is one in which the cells are open to neighboring cells in the carbon foam. While the size of the cells throughout the carbon foam will vary, the distribution of the cell sizes throughout the carbon foam is relatively uniform. In some embodiments, the carbon foam may exhibit a bimodal distribution of cell sizes.

In some embodiments, the carbon foam may exhibit a density ranging from about 0.05 g/cm$^3$ to about 0.1 g/cm$^3$, in some embodiments from about 0.2 g/cm$^3$ to about 0.8 g/cm$^3$, and in further embodiments from about 0.2 to about 0.5 g/cm$^3$. In additional embodiments, the carbon foam may exhibit a B.E.T. surface area less than about 5 m$^2$/g and typically in the range of about 1 m$^2$/g to about 2 m$^2$/g.

The carbon foam may be semi-crystalline or turbostratically-ordered and largely isotropic i.e., demonstrating physical properties that are approximately equal in all directions. The carbon foam may exhibit pore sizes on the order of less than 300μ although pore sizes of up to 500μ are possible. In some embodiments, the thermal conductivities of carbon foam may be less than about 1.0 W/m/° K. The compressive strength of the carbon foam may generally range from about 300 p.s.i. to about 10,000 p.s.i., or more. In further embodiments, the carbon foam may demonstrate compressive strengths on the order of from about 2000 p.s.i. to about 6000 p.s.i. at densities of from about 0.4 g/cm$^3$ to about 0.5 g/cm$^3$. Additionally, the may exhibit relatively low overall B.E.T. surface areas. Such surface areas are typically less than about 5 m$^2$/g and are commonly in the range of about 1 m$^2$/g to about 2 m$^2$/g.

As referenced above, a carbon foam body is used in forming the infiltrated carbon foam composite. Carbon foam is generally available in sheets or blocks and is readily machinable. The thickness of the carbon foam body for the infiltrated carbon foam composite is not particularly limited. In some embodiments, the thickness of the carbon foam body may range from about 0.25 inches to about 4 inches or greater. In some embodiments the thickness of the carbon foam body may range from about 0.75 inches to about 1.5 inches, and in further embodiments may be about 1 inch.

Carbon foams may be produced using a variety of feedstocks known to those skilled in the art. Carbon foam may be any produced, for example, from pitches, mesophase carbon, mesophase pitches, coal, coal extracts, coal derivatives. Further, carbon foam may also be produced by carbonizing polymeric foams. Such polymeric foams may include, but are not limited to, phenolic foams and resorcinol foams. Other types of polymeric foams may include, but are not limited to, those polymeric foams made from vinylidene chloride, furfuryl alcohol, furan resins, polyacrylonitrile, polyurethane, combinations thereof, or other carbonizable polymers. One suitable carbon foam is a coal-based carbon foam commercially available in varying densities as CFOAM® 15, CFOAM® 20, and CFOAM® 25 (Touchstone Research Laboratory, Ltd., Triadelphia, W.V.).

The infiltrated carbon foam composite further comprises carbonized carbon aerogel located within cells of the carbon foam body. The carbonized carbon aerogel is a carbon aerogel that has been located in the cells of the carbon foam body and subsequently carbonized at relative high temperatures to carbonize the carbon aerogel. The carbonized carbon aerogel preferably is located in a majority of the cells of the carbon foam. In some embodiments the carbonized carbon aerogel is located in at least about half of the carbon foam cells, for additional embodiments in greater than about 75% of the carbon foam cells, and for still further embodiments in greater than about 90% of the carbon foam cells. In other embodiments, the carbonized carbon aerogel is contained in predominately all of the cells of the carbon foam body.

In the infiltrated carbon foam composite, a resin is located in and fills the cells of the carbon foam body and around the carbonized carbon aerogel. The resin substantially fills the void space in the cells of the carbon foam body and the void space of the carbonized carbon aerogel. As used herein "resin" includes polymer or resin-based materials. In some embodiments the resin is a thermoset resin. In certain embodiments, the resin is a phenolic resin, such as Cellobond J2027L or SC1008.

To form the infiltrated carbon foam composite a carbon foam body is selected. The carbon foam for the carbon foam body should be an open celled carbon foam. In order to infiltrate the carbon foam body with the carbon aerogel solution and a resin, the carbon foam should be open celled to provide pathways for infiltration of the carbon aerogel solution and resin. The physical properties of the carbon foam can vary widely and can depend upon the particular application for the carbon foam composite.

The carbon foam body is infiltrated with a carbon aerogel. The open cells of the carbon foam body are infiltrated with a carbon aerogel solution used for forming the carbon aerogel. The solvent of the carbon aerogel solution is then removed leaving the carbon aerogel within the cells of the carbon foam body. Techniques for forming a carbon aerogel are known to those skilled in the art and may be generally used to form the aerogel in the cells of the carbon foam body.

Next, the carbon aerogel is carbonized. To accomplish the carbonization of the carbon aerogel, the carbon foam body with the carbon aerogel in the cells of the carbon foam body is placed in a furnace. The temperature is slowly increased from ambient conditions up to about 900° C. The upper temperature is not critical except that the upper temperature should be high enough to carbonize the carbon aerogel contained in the cells of the carbon foam body. One example of a heating profile for carbonization is heating at 0.2° C./min from ambient temperature up to 900° C. with isothermal holds at about 150° C., 450° C., and 900° C., which results in the carbonization of the carbon aerogel, thus forming a carbonized carbon aerogel. Other heating rates and temperature profiles may be used as well.

Once the carbon aerogel has been carbonized, the carbon foam body with the carbonized carbon aerogel is infiltrated with a resin. Vacuum assisted resin transfer molding techniques may be used for impregnating the carbon foam body with the carbonized carbon aerogel with resin. The resin is infiltrated into the carbon foam body and cured according to the resin system being used. In certain embodiments, the resin system may include, but is not limited to, a phenolic resin system. Upon curing of the resin, the infiltrated carbon foam composite has been formed.

The following examples will serve to illustrate the production of the carbon foams of the present invention.

EXAMPLE

Infiltrated carbon foam composites were prepared and tested as a thermal protection system. Half inch and one inch thick carbon foam bodies were prepared from CFOAM® 15 (about 0.22 g/cc to about 0.28 g/cc), CFOAM® 20 (about 0.31 g/cc to about 0.33 g/cc), and CFOAM® 25 (about 0.46 g/cc to about 0.47 g/cc). The carbon foam bodies were infiltrated with carbon aerogel. The carbon foam body/carbon aerogel was subjected to carbonization by heating the sample at 0.2° C./min from ambient temperature up to 900° C. with isothermal holds at about 150° C., 450° C., and 900° C., to produce carbonized carbon aerogel within the cells of the carbon foam body. The carbon foam body/carbonized carbon aerogel sample was infiltrated with phenolic resin using standard VARTM techniques.

Each of the infiltrated carbon foam composites was tested as a thermal protection system. Samples were exposed to a $CO_2$ laser heat source at 150 W/cm$^2$ and 350 W/cm$^2$. Nitrogen was flowed across the heated surfaces of the samples at Mach 0.4 flow conditions. The backside temperature (cold surface) and mass loss of the samples were measured.

All samples tested saw less that 100° F. backside temperature rise during extreme heating. In general, the thick samples performed better than thin ones. Comparison between carbon foam densities showed that the higher density carbon foam composites (CFOAM® 25) had better thermal characteristics than the lower density carbon foam composites (CFOAM® 20) although in expense of much larger mass loss (25% vs. 5%). The composite prepared from one inch thick CFOAM® 20 with carbonized aerogel and J2027L phenolic resin illustrated unexpectedly good thermal and mechanical responses at 350 W/cm$^2$. The temperature increase was less than 15° F., and the mass loss was around 14%.

All of the one inch thick samples tested at the 150 W/cm$^2$ heat flux were consistent with the results from the 350 W/cm$^2$ heat flux with the one inch thick CFOAM® 20/carbonized aerogel/J2027L phenolic resin composite performing the best. Plain carbon foams, CFOAM® 20 and CFOAM® 25 and also aerogel infiltrated CFOAM® 25 were practically unaffected mechanically at this thermal load due to their mass loss values being less than 5%.

As the invention has been described, it will be apparent to those skilled in the art that the same may be varied in many ways without departing from the spirit and scope of the invention. Any and all such modifications are intended to be included within the scope of the appended claims.

What is claimed is:

1. An infiltrated carbon foam composite comprising:
    a carbon foam body having a plurality of open cells distributed throughout the carbon foam body;
    carbonized carbon aerogel located within at least a portion of the cells of the carbon foam body; and
    a resin filling at least a portion of the carbon foam cells containing carbonized carbon aerogel.

2. The infiltrated carbon foam composite of claim 1 wherein the carbon foam body has a density ranging from about 0.05 g/cm$^3$ to about 0.8 g/cm$^3$.

3. The infiltrated carbon foam composite of claim 1 wherein the carbon foam body has a density ranging from about 0.2 to about 0.6 g/cm$^3$.

4. The infiltrated carbon foam composite of claim 1 wherein the resin is phenolic resin.

5. The carbon foam of claim 1 wherein the carbon foam body has a density ranging from about 0.2 to about 0.6 g/cm$^3$, and wherein the resin is phenolic resin.

6. A method for making an infiltrated carbon foam composite comprising the steps of:
    forming a carbon aerogel in the cells of a carbon foam body;
    carbonizing the carbon aerogel within the cells of the carbon foam body; and
    infiltrating the carbon foam body having carbonized carbon aerogel within cell of the carbon foam body with a resin.

7. The method of claim 6 wherein the carbon foam body has a density ranging from about 0.05 g/cm$^3$ to about 0.8 g/cm$^3$.

8. The method of claim 6 wherein the carbon foam body has a density ranging from about 0.2 to about 0.6 g/cm$^3$, and wherein the resin is phenolic resin.

9. The method of claim 6 wherein the step of forming a carbon aerogel in the cells of a carbon foam body forms a carbon aerogel in at least half of the cells of the carbon foam body.

10. The method of claim 6 wherein the step of forming a carbon aerogel in the cells of a carbon foam body forms a carbon aerogel in at least 75% of the cells of the carbon foam body.

11. The method of claim 6 wherein the step of forming a carbon aerogel in the cells of a carbon foam body forms a carbon aerogel in predominately all of the cells of the carbon foam body.

* * * * *